(12) United States Patent
Abkowitz et al.

(10) Patent No.: US 6,620,523 B2
(45) Date of Patent: Sep. 16, 2003

(54) TITANIUM COMPOSITE SKATE BLADES

(75) Inventors: Stanley Abkowitz, Lexington, MA (US); Susan M. Abkowitz, Winchester, MA (US); Harold L. Heussi, Essex, MA (US); Paul F. Weihrauch, Newton, MA (US)

(73) Assignee: Dynamet Technology, Burlington, MA (US)

(*) Notice: Subject to any disclaimer, the term of this patent is extended or adjusted under 35 U.S.C. 154(b) by 0 days.

(21) Appl. No.: 09/988,623

(22) Filed: Nov. 20, 2001

(65) Prior Publication Data

US 2002/0039659 A1 Apr. 4, 2002

Related U.S. Application Data

(63) Continuation of application No. 08/672,629, filed on Jun. 28, 1996, now Pat. No. 6,318,738.
(60) Provisional application No. 60/000,651, filed on Jun. 29, 1995.

(51) Int. Cl.⁷ .................. B32B 15/04; B32B 15/00; A63C 1/30
(52) U.S. Cl. .............. 428/627; 428/660; 428/698; 428/472; 280/11.18
(58) Field of Search ................. 428/660, 661, 428/627, 632, 472, 548, 550, 698; 280/11.12, 11.18, 28

(56) References Cited

U.S. PATENT DOCUMENTS

| 4,673,550 A | 6/1987 | Dallaire et al. ................ 419/12 |
| 4,731,115 A | 3/1988 | Abkowitz et al. ............. 75/236 |
| 4,746,532 A | 5/1988 | Suzuki et al. .................. 427/2 |
| 4,906,430 A | 3/1990 | Abkowitz et al. ............. 419/6 |
| 4,968,348 A | 11/1990 | Abkowitz et al. ............. 75/244 |
| 5,448,828 A | 9/1995 | Willems et al. ............ 29/899.1 |
| 6,318,738 B1 * | 11/2001 | Abkowitz et al. ....... 280/11.18 |

FOREIGN PATENT DOCUMENTS

| JP | 4-297284 | * 10/1992 |

* cited by examiner

Primary Examiner—Holly Rickman
(74) Attorney, Agent, or Firm—Finnegan, Henderson, Farabow, Garrett & Dunner

(57) ABSTRACT

An ice skate blade is provided which has improved fracture toughness, strength, corrosion resistance, and wear resistance, while at the same time being lighter weight than other materials of manufacture.

4 Claims, 2 Drawing Sheets

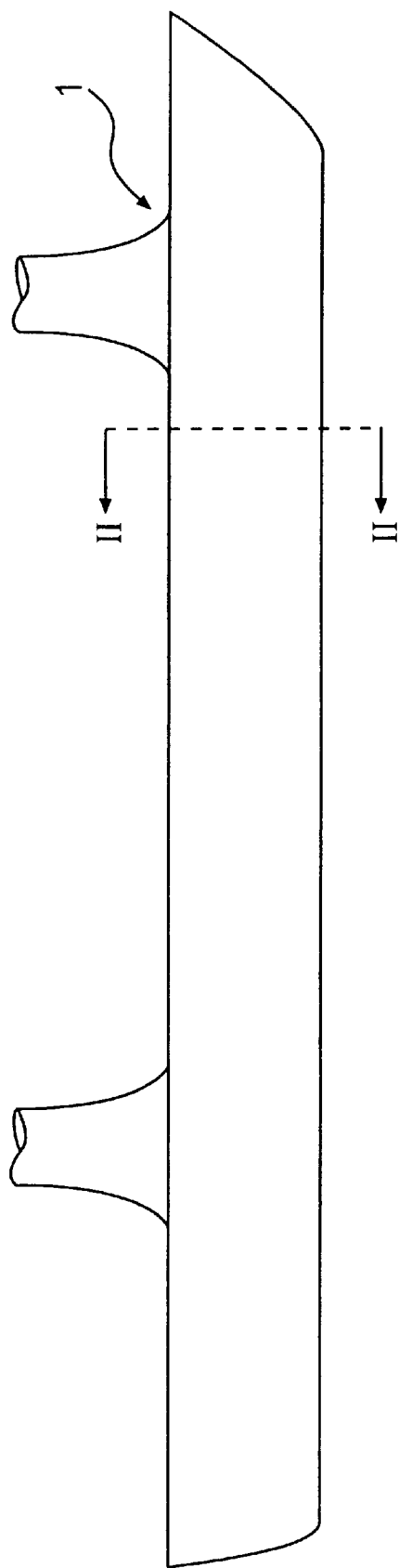

TITANIUM COMPOSITE SKATE BLADES

This is a continuation of application Ser. No. 08/672,629, filed Jun. 28, 1996, now U.S. Pat. No. 6,318,738, and claims the benefit of U.S. provisional application No. 60/000,651, filed Jun. 29, 1995, all of which are incorporated herein by reference.

BACKGROUND OF THE INVENTION

1. Field of the Invention

The present invention relates to ice skates. More particularly, the invention relates to ice skate blades.

2. Description of the Related Art

Ice skate blades are often subjected to severe mechanical stresses and strains. For example, hockey players are required to accelerate quickly, turn sharply, and stop suddenly. These movements subject the skate blades to extreme bending and torsional stresses.

Not only are the skate blades required to resist mechanical failure, they must also be corrosion resistant. Skate blades are continually exposed to melted ice, requiring the blade material to be rust-proof as well as strong.

A further problem in the ice skate blade's working environment is the tribological damage done to the blade edges. To the casual observer, skate blades easily glide along the surface of the ice. However, the edges of the blades are continually worn down. The problem is exacerbated when the user makes sharp turns or quick starts and stops. Hockey blades, in particular, require frequent sharpening. Sharpening these blades, however, is not a simple matter of running a file along the edge of the blade. Both figure skaters and hockey players usually take their skates to be sharpened by trained professionals who sharpen the blades according to a very particular method. Obviously, the costs of maintaining skate blades can be very high.

Generally, all of these problems get more pronounced as the user becomes more skilled. The more the skater practices, the longer the skate blade is subjected to corrosion and wear. Moreover, as the skater improves, he or she will more frequently perform complicated and difficult moves, placing ever increasing stress on the blades.

Traditional skate blades use conventional materials such as high carbon steel. Steel, however, is heavy. The heavier the blade, the more a skater has to work. Skater fatigue sets in more quickly and maneuverability is diminished.

Other candidate materials are light weight, but have other setbacks. For instance, ceramics are known to have high hardness and light weight. However, these materials have a fracture toughness much too low for practical use.

In light of the foregoing, there is a need for an ice skate blade which can operate effectively in this harsh environment with reduced weight and a high fracture toughness without requiring frequent cleaning and sharpening.

SUMMARY OF THE INVENTION

Accordingly, the present invention is directed to an ice skate blade that substantially obviates one or more of the problems of the related art.

One object of the present invention is provide an ice skate blade which has improved strength, corrosion resistance, and wear resistance, while at the same time being lighter than traditional materials of manufacture.

Additional features and advantages of the invention will be set forth in the description which follows, and in part will be apparent from the description, or may be learned by practice of the invention. The objectives and other advantages of the invention will be realized and attained by the ice skate blade particularly pointed out in the written description and claims hereof as well as the appended drawings.

To achieve these and other advantages, and in accordance with the purposes of the invention, as broadly described, the invention includes an ice skate blade comprised of a titanium material which is reinforced by a hard constituent.

It is to be understood that both the foregoing general description and the following detailed description are exemplary and explanatory and are intended to provide further explanation of the invention as claimed.

The accompanying drawings are included to provide a further understanding of the invention and are incorporated in and constitute part of the specification, illustrate several embodiments of the invention and together with the description serve to explain the principles of the invention.

BRIEF DESCRIPTION OF THE DRAWINGS

FIG. 1 is an illustration of an ice skate blade.

DETAILED DESCRIPTION OF THE PREFERRED EMBODIMENTS

Titanium is an excellent material from the standpoint of its strength and fracture resistance. It is also remarkably lightweight. Because of these properties it is ideally suited for use as the core material for several embodiments. As used herein, "titanium material" refers to any titanium based material such as commercially pure titanium, titanium alloys and titanium matrix composites.

A preferred titanium material for the purposes of this invention is a titanium matrix composite of a matrix of Ti-6Al-4V with TiC particles dispersed therein. Such a composite may be produced by powder metallurgy techniques, and is described in U.S. Pat. No. 4,371,115, incorporated herein by reference.

Figure 2:
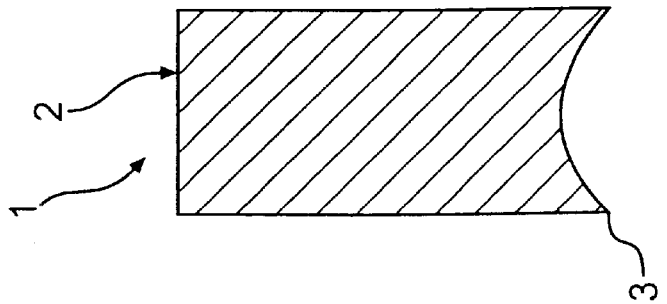
FIG. 2 is a partial cross-sectional view of an ice skate blade made of a solid titanium metal matrix composite.

FIG. 2 shows one embodiment in which a blade 1 is made of a solid composite material 2. The lower outer portions of the blade are sharpened to hold two edges 3.

Figure 3:
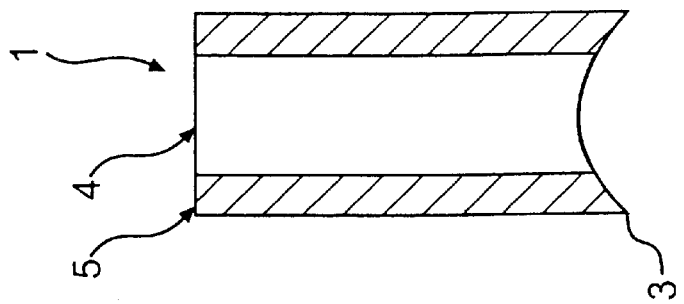
FIG. 3 is a partial cross-sectional view along line II—II in FIG. 1 of an ice skate blade made of a titanium alloy core clad on its two outer edges with a titanium composite material having TiC in a titanium alloy matrix.

The blade of FIG. 3 has a core 4 made of a titanium alloy clad on two sides with a titanium composite material having TiC in a titanium alloy matrix 5. In this and the remaining embodiments, the lower portions of the clad material are sharpened to form durable edges 3.

Figure 4:
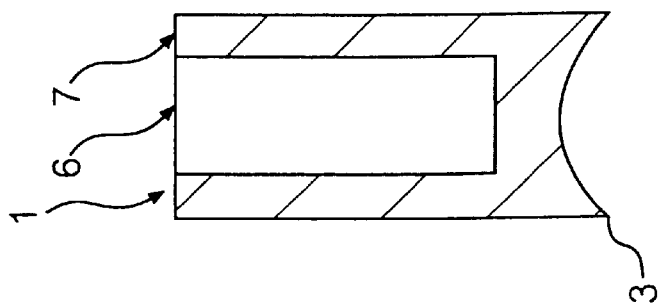
FIG. 4 is a partial cross-sectional view along line II—II in FIG. 1 of an ice skate blade made of a titanium alloy core clad on three sides with a titanium composite material having TiC in a titanium alloy matrix.

FIG. 4 is a partial cross-sectional view of an ice skate blade made of a titanium alloy core 6 clad on three sides with a titanium composite material having TiC in a titanium alloy matrix 7.

Figure 5:
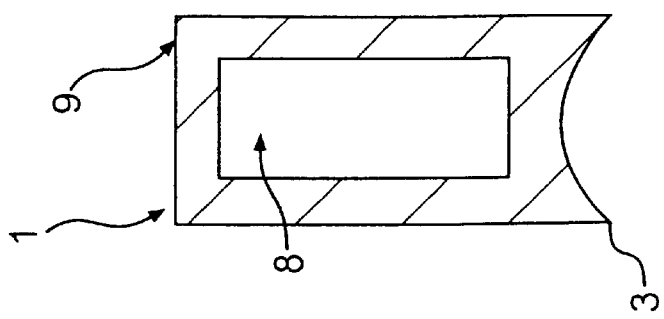
FIG. 5 is a partial cross-sectional view of an ice skate blade made of a titanium alloy core clad on four sides with a titanium composite material having TiC in a titanium alloy matrix.

FIG. 5 is a partial cross-sectional view of an ice skate blade made of a titanium alloy core 8 clad on four sides with a titanium composite material having TiC in a titanium alloy matrix 9.

Specific examples of titanium matrix composites are materials having a matrix of Ti-6Al-4V with 5%, 10% or 15% TiC. The amount of the TiC may vary from these percentages however.

Another useful combination materials is shown in U.S. patent application Ser. No. 08/975,709, now abandoned, of Stanley Abkowitz, Susan M. Abkowitz, Paul F. Wiehrauch, and Harold L. Heussi, entitled "Bi-Metallic Macro Composite", and filed concurrently herewith. This composite is comprised of a titanium material core clad with a zirconium material, such as zirconium oxide, commercially pure zirconium or a zirconium alloy outer layer.

Zirconium has excellent corrosion and wear resistance. It's bulk properties, however, are not as good as a titanium based material. When titanium material is clad with layers of zirconium, the resulting blade is lightweight, strong, and resistant to fracture, corrosion and wear. The high hardness of oxidized zirconium produces a high quality blade having good edge retention.

Other composites may also be used to practice the invention. These composites and methods for manufacturing and cladding them are disclosed in U.S. Pat. Nos. 4,906,430 and 4,968,348, each of which is incorporated herein by reference. Thus, a blade comprised of a titanium material with reinforcing $TiB_2$ or TiB may be produced. Advantageously, these materials may be made by powder metallurgy techniques.

It will be apparent to those skilled in the art that various modifications and variations can be made in the ice skate of the present invention without departing from the spirit or scope of the invention. Thus, it intended that the present invention cover the modifications and variations of this invention provided they come within the scope of the appended claims and their equivalents.

What is claimed is:

1. An ice skate blade comprising:

an elongated blade comprising a titanium matrix composite, wherein said titanium matrix composite is made by a powder metal process, said process being performed below the melting point of titanium and including:

mixing and compacting a blend of titanium powder, alloy powder, and powder comprising at least one material chosen from TiC, TiB, and $TiB_2$; and sintering said blend to form said titanium matrix composite without melting, said titanium matrix composite comprising a titanium alloy and at least one particle chosen from TiC, TiB, and $TiB_2$ dispersed therein.

2. An ice skate blade comprising:

a solid, elongated blade comprising a titanium matrix composite, wherein said titanium matrix composite is made by a powder metal process, said process being performed below the melting point of titanium and including:

mixing and compacting a blend of titanium powder, alloy powder, and powder comprising at least one material chosen from TiC, TiB, and $TiB_2$; and sintering said blend to form said titanium matrix composite without melting said titanium matrix composite comprising titanium alloy and at least one particle chosen from TiC, TiB, and $TiB_2$ dispersed therein.

3. The ice skate blade of claim 2, wherein the titanium alloy comprises Ti-6Al-4V.

4. The ice skate blade of claim 1, wherein the titanium alloy comprises Ti-6Al-4V.

* * * * *